(12) United States Patent
Kupcsik et al.

(10) Patent No.: US 12,277,781 B2
(45) Date of Patent: Apr. 15, 2025

(54) DEVICE AND METHOD FOR TRAINING A MACHINE LEARNING MODEL FOR RECOGNIZING AN OBJECT TOPOLOGY OF AN OBJECT FROM AN IMAGE OF THE OBJECT

(71) Applicant: Robert Bosch GmbH, Stuttgart (DE)

(72) Inventors: Andras Gabor Kupcsik, Boeblingen (DE); Markus Spies, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 378 days.

(21) Appl. No.: 17/911,318

(22) PCT Filed: Jun. 22, 2021

(86) PCT No.: PCT/EP2021/067011
§ 371 (c)(1),
(2) Date: Sep. 13, 2022

(87) PCT Pub. No.: WO2022/002698
PCT Pub. Date: Jan. 6, 2022

(65) Prior Publication Data
US 2023/0115521 A1    Apr. 13, 2023

(30) Foreign Application Priority Data

Jul. 1, 2020 (DE) .................. 10 2020 208 211.1

(51) Int. Cl.
*G06V 20/64* (2022.01)
*B25J 9/16* (2006.01)
(Continued)

(52) U.S. Cl.
CPC .......... *G06V 20/653* (2022.01); *B25J 9/1697* (2013.01); *B25J 13/08* (2013.01); *G05B 19/4155* (2013.01);
(Continued)

(58) Field of Classification Search
CPC .... G06V 20/653; G06V 10/774; G06V 10/46; G06V 20/647; G06V 10/44; G06T 7/75;
(Continued)

(56) References Cited

U.S. PATENT DOCUMENTS 10,796,482 B2 * 10/2020 Ge ..................... G06N 3/045
2014/0093146 A1 * 4/2014 Inanc ................. G06V 40/1353
382/125
(Continued)

FOREIGN PATENT DOCUMENTS

CN 113610711 B * 5/2023
JP 2004021773 A * 1/2004 ............. G06T 17/20
(Continued)

OTHER PUBLICATIONS

Sandip; Roy et al. "An explicit formula for differences between Laplacian-eigenvector components using coalesced graphs" Jan. 20, 2010, IEEE, Proceedings of the 48th IEEE Conference on Decision and Control (CDC) (Year: 2010).*
(Continued)

*Primary Examiner* — Aaron W Carter
*Assistant Examiner* — Alejandro Hernandez
(74) *Attorney, Agent, or Firm* — NORTON ROSE FULBRIGHT US LLP; Gerard A. Messina

(57) ABSTRACT

A method for training a machine learning model for recognizing an object topology of an object from an image of the object. The method includes obtaining a 3D model of the object, wherein the 3D model comprises a mesh of vertices connected by edges, wherein each edge has a weight which specifies proximity of two vertices connected by the edge in the object; determining a descriptor for each vertex of the mesh by searching descriptors for the vertices which minimize the sum, over pairs of connected vertices, of distances between the descriptors of the pair of vertices weighted by
(Continued)

the weight of the edge between the pair of vertices; generating training data image pairs, wherein each training data image pair comprises a training input image showing the object and a target image; and training the machine learning model by supervised learning using the training data image pairs as training data.

11 Claims, 4 Drawing Sheets

(51) Int. Cl.
　　*B25J 13/08*　　　(2006.01)
　　*G05B 19/4155*　　(2006.01)
　　*G06N 3/09*　　　(2023.01)
　　*G06T 7/73*　　　(2017.01)
　　*G06V 10/46*　　　(2022.01)
　　*G06V 10/774*　　(2022.01)
(52) U.S. Cl.
　　CPC .............. *G06N 3/09* (2023.01); *G06T 7/75* (2017.01); *G06V 10/46* (2022.01); *G06V 10/774* (2022.01); *G05B 2219/40269* (2013.01); *G06T 2207/20081* (2013.01)
(58) Field of Classification Search
　　CPC ... G06T 2207/20081; G06T 7/70; G06N 3/09; B25J 9/1697; B25J 13/08; B25J 9/163; G05B 19/4155; G05B 2219/40269
　　See application file for complete search history.

(56) References Cited

U.S. PATENT DOCUMENTS

| | | | | |
|---|---|---|---|---|
| 2014/0355843 | A1* | 12/2014 | Da | G06V 40/168 382/118 |
| 2015/0100289 | A1 | 4/2015 | Kimmel et al. | |
| 2019/0258225 | A1* | 8/2019 | Link | G06T 7/70 |
| 2020/0410733 | A1* | 12/2020 | Liu | G06T 15/10 |
| 2022/0301262 | A1* | 9/2022 | Aksit | G06N 3/08 |
| 2023/0073340 | A1* | 3/2023 | Cao | G06N 3/0464 |
| 2023/0377160 | A1* | 11/2023 | Jain | G06V 10/26 |
| 2023/0421977 | A1* | 12/2023 | Araujo-Simon | G06F 30/20 |
| 2024/0062467 | A1* | 2/2024 | Sarkis | G06V 10/82 |
| 2024/0212279 | A1* | 6/2024 | Lee | G06T 13/40 |

FOREIGN PATENT DOCUMENTS

| | | | | |
|---|---|---|---|---|
| WO | WO-2011139232 | A1 * | 11/2011 | A61B 5/055 |
| WO | 2019/099095 | A1 | 5/2019 | |

OTHER PUBLICATIONS

Hsu Shun-Pin et al. "Laplacian Controllability of Threshold Graphs" Jun. 13, 2018, IEEE, (Year: 2018).*

International Search Report for PCT/EP2021/067011, Issued Oct. 20, 2021.

Periyasamy et al., "Refining 6D Object Pose Predictions using Abstract Render-and-Compare." IEEE-RAS 19th ntemational Conference on Humanoid Robots, (2019) pp. 739-746.

Belkin et al., "Lapacian Eigenmaps for Dimensionality Reduction and Data Representation," Neural Compulation 15, (2003) pp. 1373-1396.

Castro et al., "Accurate 6D Object Pose Estimation By Pose Conditioned Mesh Reconstruction" 2020 IEEE International Conference on Acoustics, Speech and Signal Processing, (2020) pp. 4147-4151.

Depierre et al., "Jacquasrd: A Large Scale Dataset for Robotic Grasp Detection", IEEE International Conference on Intelligent Robots and Systems, (2018) pp. 3511-3516.

Belkin et al., "Discrete Laplace Operator on Meshed Surfaces", Conference: Proceedings of the 24th ACM Symposium on Computational Geometry, (2008) pp. 278-287.

Mahler et al., "Dex-Net 2.0: Deep Learning to Plan Robust Grasps with Synthetic Point Clouds and Analytic Grasp Metrics", Conferece: Robotics, Science and Systems, (2017).

Florence et al., "Dense Object Nets: Learning Dense Visual Object Descriptors By and For Robotic Manipulation", CSAIL Massachusetts Institute of Technology, (2018).

* cited by examiner

DEVICE AND METHOD FOR TRAINING A MACHINE LEARNING MODEL FOR RECOGNIZING AN OBJECT TOPOLOGY OF AN OBJECT FROM AN IMAGE OF THE OBJECT

FIELD

The present invention relates to devices and methods for training a machine learning model for recognizing an object topology of an object from an image of the object.

BACKGROUND INFORMATION

To allow flexible production or processing of objects by a robot, it is desirable that the robot is able to handle an object irrespective of the pose with which the object is placed in the robot's workspace. Therefore, the robot should be capable of recognizing which parts of the object are located at which positions such that it may, for example, grab the object at the correct location, e.g. for mounting it on another object, or to weld the object at the current location. This means that the robot should be capable of recognizing the object's (surface) topology, for example from one or more images taken by a camera mounted on the robot. An approach to achieve this is to determine descriptors, i.e., points (vectors) in a predefined descriptor space, to parts of the object (i.e. pixels of the object represented in an image plane), wherein the robot is trained to assign the same descriptors to the same parts of an object independent from a current pose of the object.

The paper "Dense Object Nets: Learning Dense Visual Object Descriptors By and For Robotic Manipulation" by Peter Florence et al., referred to as reference 1 in the following, describes Dense Object Nets which are models for self-supervised dense descriptor learning.

However, the efficacy of the approach of reference 1 relies heavily on the collected training data and the involved sensors and the descriptors determined from self-supervised learning often lack explainability. Accordingly, approaches that enhance training for recognizing of object topology in that regards are desirable.

SUMMARY

According to various embodiments of the present invention, a method for training a machine learning model for recognizing an object topology of an object from an image of the object is provided, comprising obtaining a 3D model of the object, wherein the 3D model comprises a mesh of vertices connected by edges, wherein each edge has a weight which specifies the proximity of two vertices connected by the edge in the object, determining a descriptor for each vertex of the mesh by searching descriptors for the vertices which minimize the sum, over pairs of connected vertices, of distances between the descriptors of the pair of vertices weighted by the weight of the edge between the pair of vertices, generating training data image pairs, wherein each training data image pair comprises a training input image showing the object and a target image and wherein generating the target image comprises determining the vertex positions of vertices of the object's object model that the vertices have in the training input image and assigning, for each determined vertex position in the training input image, the descriptor determined for the vertex at the vertex position to the position in the target image and training the machine learning model by supervised learning using the training data image pairs as training data.

The training method described above allows training a machine learning model (such as neural network) to perform more accurate prediction (i.e., descriptor determination) compared to using self-supervised training (i.e., allows for a larger variety of applications of the network). Furthermore, it gives greater flexibility for adapting the machine learning model to be applied to different problems, reduces the training data requirements (e.g., the amount of training data required) and gives rise to an explainable machine learning tool.

In the following, various examples are given.

Example 1 is the method for training a machine learning model for recognizing an object topology of an object from an image of the object as described above.

Example 2 is the method of Example 1, wherein generating the training data image pairs comprises obtaining multiple images of the object in different poses and generating a training data image pair from each obtained image by generating a target image for the obtained image.

This allows training the machine learning model (e.g. a robot having a robot controller implementing the machine learning model) to recognize an object's topology irrespective of the object's pose, e.g. in the workspace of the robot.

Example 3 is the method of Example 1 or 2, comprising determining the vertex positions of vertices of the object's object model that the vertices have in the training input images from the respective poses the object has in the training input images (e.g. in the camera coordinate system).

This allows exact determination of the vertices positions which in turn allows exact target images for supervised training.

Example 4 is the method of any one of Examples 1 to 3, wherein searching the descriptors comprises determining eigenvectors of the Laplacian matrix of the graph formed by the vertices and edges of the 3D model and taking components of the eigenvectors as components of the descriptors.

This allows efficient determination of (near-)optimal descriptors. For example, each descriptor is a vector of the dimension d and thus has d components (e.g. (3, 4) is a vector of dimension 2 and has components 3 and 4).

Example 5 is the method of Example 4, comprising associating each vertex associated with a component position in the eigenvectors and taking, for each vertex, the components in the eigenvectors at the component position associated with the vertex as components of the descriptor for the vertex.

In particular, the descriptor space dimension may be flexibly chosen by selection of a number of eigenvector components for a descriptor corresponding to a desired descriptor space dimension.

Example 6 is the method of Example 5, wherein determining the descriptors further comprises compressing the descriptors by combining components of eigenvectors whose eigenvalues differ by less than a predetermined threshold to a single component.

This allows reduction of the descriptor space dimension when the object is symmetrical. In other words, unnecessary distinction between symmetric parts of the object can be avoided.

Example 7 is the method of any one of Examples 1 to 6, wherein obtaining the 3D model of the object comprises obtaining a 3D mesh of vertices and edges modelling the object and assigning, as weights for the edges, the edge weights of a Laplace-Beltrami operator applied to the mesh.

Using this approach allows taking into account the geometry of the model when determining the proximity of two vertices by taking the geodesic distance on the object rather than the Euclidean metric in a surrounding space, which may be inaccurate when the object is curved.

Example 8 is a method for controlling a robot comprising training a machine learning model according to any one of Examples 1 to 7, obtaining an image showing the object, feeding the image to the machine learning model, determining a pose of the object from the output of the machine learning model and controlling the robot depending on the determined pose of the object.

Example 9 is the method of Example 8, wherein determining the object pose comprises determining the position of a certain part of the object and wherein controlling the robot depending on the determined pose of the object comprises controlling an end-effector of the robot to move to the position of the part of the object and to interact with the part of the object.

Example 10 is a software or hardware agent, in particular robot, comprising a camera configured to provide image data of an object, a controller configured to implement a machine learning model and a training device configured to train the machine learning model by the method of any one of Examples 1 to 7.

Example 11 is a software or hardware agent according to Example 10 comprising at least one actuator, wherein the controller is configured to control the at least one actuator using an output from the machine learning model.

Example 12 is a computer program comprising instructions which, when executed by a processor, makes the processor perform a method according to any one of Examples 1 to 9.

Example 13 is a computer readable medium storing instructions which, when executed by a processor, makes the processor perform a method according to any one of Examples 1 to 9.

In the figures, similar reference characters generally refer to the same parts throughout the different views. The figures are not necessarily to scale, emphasis instead generally being placed upon illustrating the principles of the present invention. In the following description, various aspects are described with reference to the figures.

DETAILED DESCRIPTION OF EXAMPLE EMBODIMENTS

The following detailed description refers to the accompanying drawings that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

In the following, various examples will be described in more detail.

Figure 1:
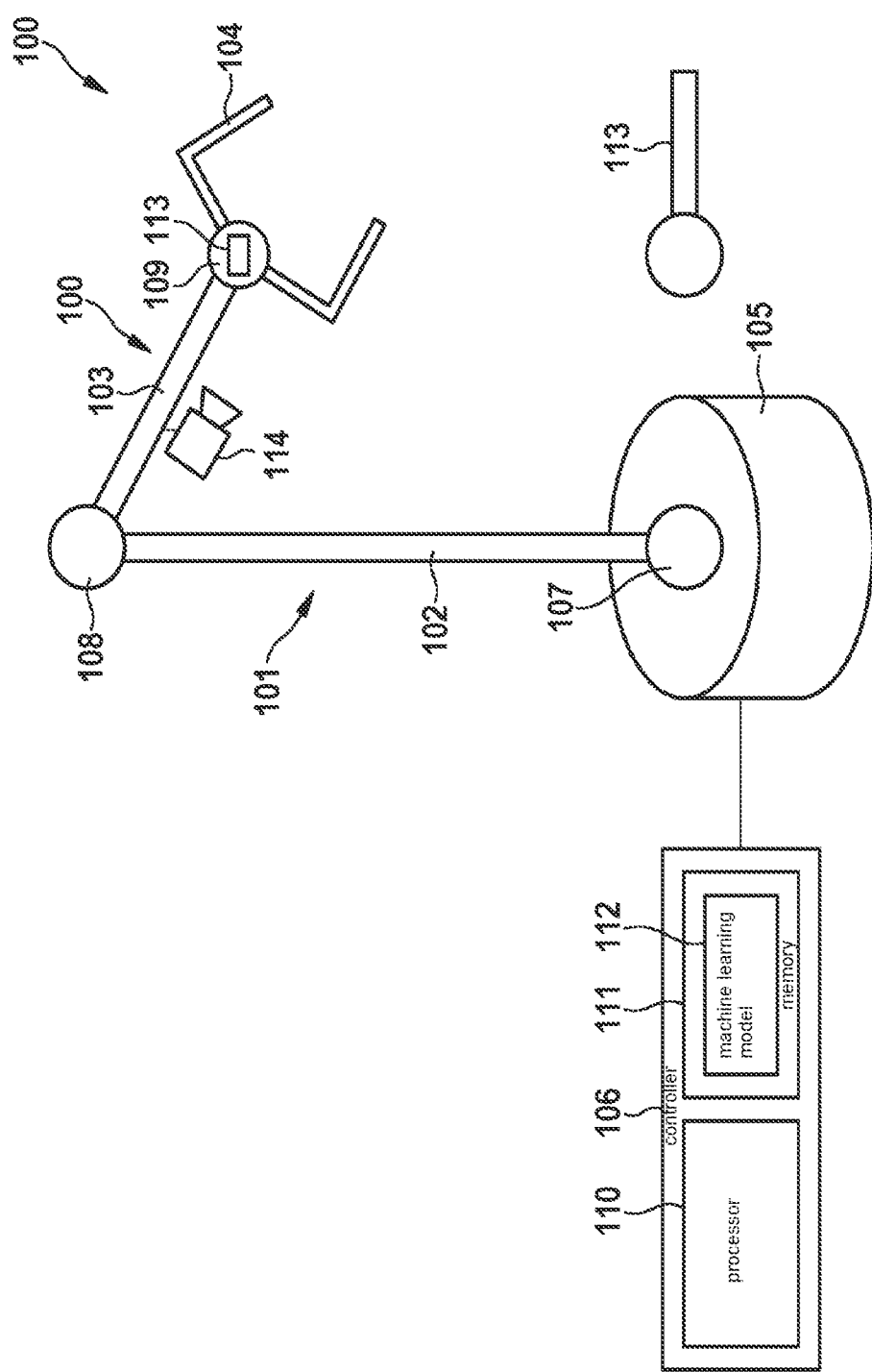
FIG. 1 shows a robot, according to an example embodiment of the present invention.

FIG. 1 shows a robot 100.

The robot 100 includes a robot arm 101, for example an industrial robot arm for handling or assembling a work piece (or one or more other objects). The robot arm 101 includes manipulators 102, 103, 104 and a base (or support) 105 by which the manipulators 102, 103, 104 are supported. The term "manipulator" refers to the movable members of the robot arm 101, the actuation of which enables physical interaction with the environment, e.g., to carry out a task. For control, the robot 100 includes a (robot) controller 106 configured to implement the interaction with the environment according to a control program. The last member 104 (furthest from the support 105) of the manipulators 102, 103, 104 is also referred to as the end-effector 104 and may include one or more tools such as a welding torch, gripping instrument, painting equipment, or the like.

The other manipulators 102, 103 (closer to the support 105) may form a positioning device such that, together with the end-effector 104, the robot arm 101 with the end-effector 104 at its end is provided. The robot arm 101 is a mechanical arm that can provide similar functions as a human arm (possibly with a tool at its end).

The robot arm 101 may include joint elements 107, 108, 109 interconnecting the manipulators 102, 103, 104 with each other and with the support 105. A joint element 107, 108, 109 may have one or more joints, each of which may provide rotatable motion (i.e., rotational motion) and/or translatory motion (i.e. displacement) to associated manipulators relative to each other. The movement of the manipulators 102, 103, 104 may be initiated by means of actuators controlled by the controller 106.

The term "actuator" may be understood as a component adapted to affect a mechanism or process in response to be driven. The actuator can implement instructions issued by the controller 106 (the so-called activation) into mechanical movements. The actuator, e.g., an electromechanical converter, may be configured to convert electrical energy into mechanical energy in response to driving.

The term "controller" may be understood as any type of logic implementing entity, which may include, for example, a circuit and/or a processor capable of executing software stored in a storage medium, firmware, or a combination thereof, and which can issue instructions, e.g. to an actuator in the present example. The controller may be configured, for example, by program code (e.g., software) to control the operation of a system, a robot in the present example.

In the present example, the controller 106 includes one or more processors 110 and a memory 111 storing code and data based on which the processor 110 controls the robot arm 101. According to various embodiments, the controller 106 controls the robot arm 101 on the basis of a machine learning model 112 stored in the memory 111.

According to various embodiments, the machine learning model 112 is configured and trained to allow the robot 100 to recognize an object 113, for example placed in a workspace of the robot arm 101. For example, the robot may decide what to do with the object 113 depending on what object it is (e.g. the object type) or may also recognize and decide which part of the object 113 should be grabbed by the end-effector 109. The robot 100 may for example be provided with one or more cameras 114 allowing it to take images of its workspace. The camera 114 is for example mounted on the robot arm 101 such that the robot may take pictures of the object 113 from various perspectives by moving around the robot arm 101.

One example for a machine learning model 112 for object recognition is a Dense Object Net. A Dense Object Net maps an image (e.g., an RGB image provided by camera 114) to an arbitrary dimensional (dimension D) descriptor space image as described in reference 1.

The Dense Object Net is a neural network which is trained to give a descriptor space image for an input image of an image using self-supervised learning. However, the efficacy of this approach relies heavily on the collected training data and the sensors (e.g., cameras 114) involved. Furthermore, the interpretation of the network prediction may be difficult.

According to various embodiments, an approach is provided for recognizing an object and its pose assuming that a 3D model (e.g., a CAD (computer aided design) model) of the object is known, which is typically the case for industrial assembly or processing tasks. According to various embodiments, nonlinear dimensionality reduction techniques are used to compute optimal target images for training input images for a neural network. Thus, rather than using self-supervised training of a neural network, supervised training of a neural network is used.

According to one embodiment, for generating training data for training the machine learning model 112, data collection is performed first. Specifically, for example, registered RGB (red green blue) images are collected. A registered image here means an RGB image with known camera intrinsics and extrinsics. In a real-world scenario, a robot mounted camera 114 (e.g., a robot wrist mounted camera) is for example used to scan an object while the robot (e.g., robot arm 101) moves around. Other extrinsic estimation techniques, e.g., ChArUco markers may be used, i.e. an object may be placed in different positions and poses relative to a ChArUco board an images of the arrangement (of ChArUco board and object) are taken. In a simulated scenario, photorealistically generated RGB images using known object poses are used.

After collecting the RGB images, for supervised training of a neural network, target images for the RBG images are rendered.

It is assumed that the pose of each object in world coordinate in every RGB image collected is known. This is straightforward for a simulated scenario, but requires manual tuning for a real-world scenario, e.g., placing the object at pre-defined positions.

With this information and using a vertex descriptor computation technique, as for example described below, for each RGB image (i.e., training input image), a descriptor image (i.e., training output image, also referred to as target image or ground truth image) is rendered.

Figure 2:
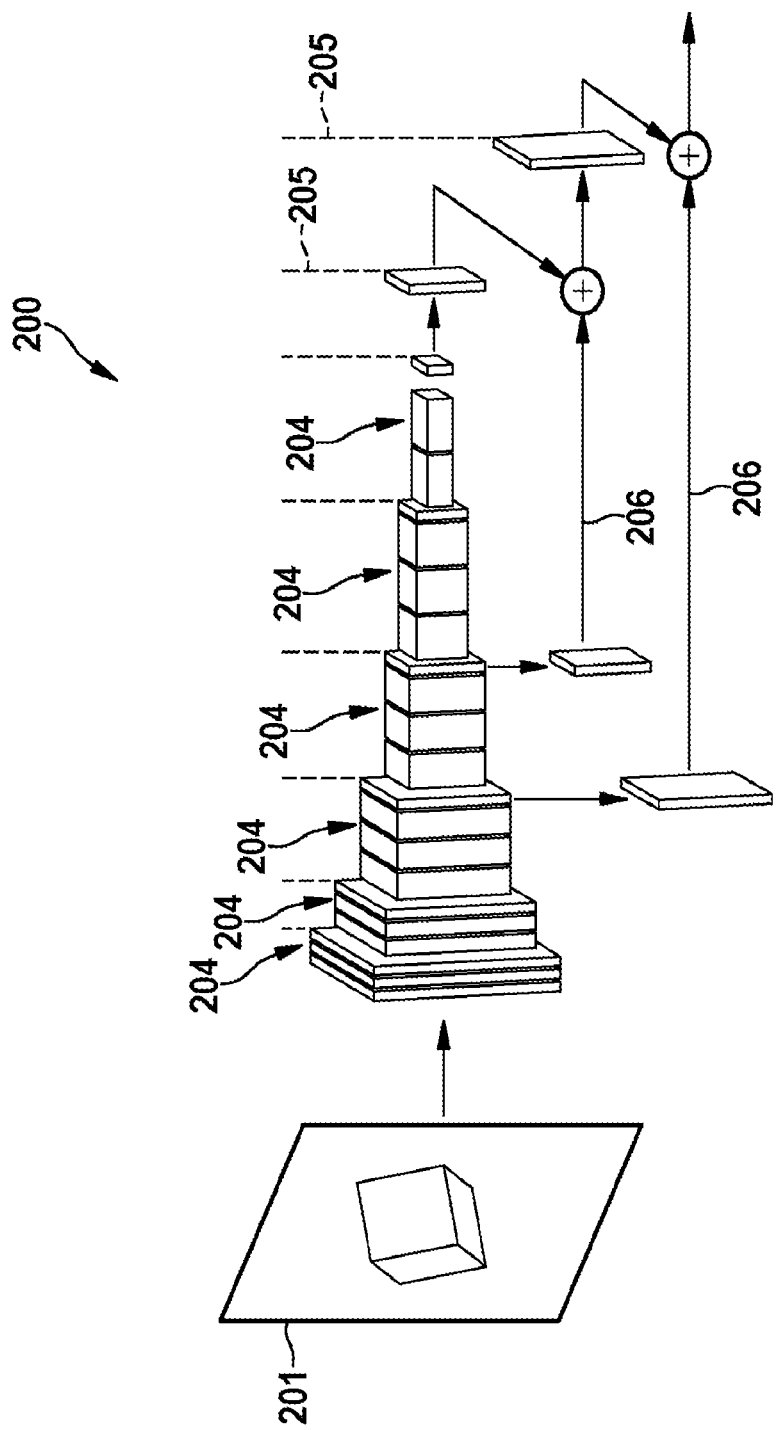
FIG. 2 illustrates training of a neural network according to an example embodiment of the present invention.

When for each RGB image a target image has been generated, i.e.

pairs of RGB images and target images have been formed, these pairs of training input image and associated target image may be used as training data for training a neural network as illustrated in FIG. 2.

FIG. 2 illustrates training of a neural network 200 according to an embodiment.

The neural network 200 is a fully convolutional network mapping a h×w×3 tensor (input image) to an h×w×D tensor (output image).

It comprises multiple stages 204 of convolutional layers followed by a pooling layer, upsampling layers 205 and skip connections 206 to combine the outputs of different layers.

For training, the neural network 200 receives a training input image 201 and outputs an output image 202 having pixel values in descriptor space (e.g. colour components according to descriptor vector components). A training loss is calculated between the output image 202 and the target image 203 associated with the training input image. This may happen for a batch of training input images and the training loss may be averaged over the training input images and the weights of the neural network 200 are training using stochastic gradient descent using the training loss. The training loss calculated between the output image 202 and the target image 203 is for example an L2 loss function (to minimize pixelwise least squares error between the target image 203 and output image 202).

The training input image 201 shows an object and the target image as well as the output image include vectors in descriptor space. The vectors in descriptor space can be mapped to colours such that the output image 202 (as well as the target image 203) resemble a heat map of the object.

The vectors in descriptor space (also referred to as (dense) descriptors) are d-dimensional vectors (e.g. d is 1, 2 or 3) assigned to each pixel in the respective image (e.g. to each pixel of the input image 201 assuming that the input image 201 and the output image 202 have the same dimension). The dense descriptors implicitly encode the surface topology of the object shown in the input image 201, invariant to its pose, or camera position.

Given a 3D model of the object, it is possible to analytically determine an optimal (in Riemannian sense) and unique descriptor vector for each vertex of the object's 3D model. According to various embodiments, using these optimal descriptors (or estimations of these descriptors determined by an optimization), target images are generated for registered RGB images, resulting in fully supervised training of the neural network 200. Additionally, the descriptor space becomes explainable and optimal irrespective of the chosen descriptor dimension d.

In the following, the 3D models are considered as Riemannian manifolds $\mathcal{M}$ embedded in $\mathbb{R}^3$, which gives rise to computing geodesics (shortest paths between vertices) while respecting the geometry. An optimal surface topology may be explicitly encoded, by embedding the 3D model in a d-dimensional Euclidean descriptor space such that geodesic distances between neighbouring vertices are preserved as best as possible. This Euclidean space is considered as the descriptor space, and a search for the optimal mapping $f: \mathcal{M} \to \mathbb{R}^d$ is performed. According to one embodiment, the Laplace operator computation for meshes and its eigende composition are used to determine (or at least estimate) the optimal embedding of vertices in descriptor space. Thus, instead of separating geodesic computation and mapping optimization, the descriptors are extracted in a single framework by computing the Laplacian of the 3D model.

According to the approach described in the following, the embedding of a 3D object model in Euclidean space into descriptor space is determined to preserve distances (e.g. geodesic distances) between vertices.

For dimensionality reduction via the Laplace Operator, let a set of points $\{x_i\}_{i=1}^N$, $x \in \mathbb{R}^D$ correspond to nodes in an undirected graph. Let $w_{ij} \geq 0$ denote the connection strength, or closeness between two nodes $x_i$ and $x_j$, e.g. $w_{ij} = \exp(-\|x_i - x_j\|_2)$.

The goal is to find a d-dimensional embedding $\{y_i\}_{i=1}^N$, $y \in \mathbb{R}^d$ (typically d<D), such that if $x_i$ and $x_j$ are close, then their embedding should also be close:

$$Y^* = \arg\min_Y \frac{1}{2}\sum_{j=1}^N \sum_{i=1}^N w_{ij}\|y_i - y_j\|_2, \quad (1)$$

where $Y=[y_1, \ldots y_N]_{d \times N}$.

The optimization problem (1) is equivalent to $$Y^* = \arg\min_Y Tr(YLY^T), \quad L = D - A, \quad (2)$$

where $L_{N \times N}$ is the positive semi-definite Laplacian matrix. A is the adjacency matrix with elements $A_{ij} = A_{ji} = w_{ij}$ and $D_{ij} = \Sigma_j A_{ij}$. It should be noted that the optimal solution $Y^*$ may have arbitrary scale and bias. To remove this randomness, the weighted second moment can be regularized with $Y^T DY = I$, which enforces unit variance in different dimensions. The resulting optimization problem then becomes $$Y^* = \arg\min_Y Tr(YLY^T), \quad (3)$$
$$\text{s.t. } YDY^T = I$$

using constrained optimization with Lagrangian parameters $\lambda \in \mathbb{R}^d$ $$\mathcal{F}(Y, \lambda) = Tr(YLY^T) - Tr(\text{diag}(\lambda)(YDY^T - I)), \quad (4)$$
$$\frac{\partial \mathcal{F}(Y, \lambda)}{\partial Y} = 2LY^T - 2\text{diag}(\lambda)DY^T,$$
$$LY^T = \text{diag}(\lambda)DY^T,$$

which is a generalized eigenvalue problem, which can be solved by standard linear algebra libraries. As L and D are positive (semi-)definite matrices, the eigenvalues can be written as $$\lambda_0 = 0 \leq \lambda_1 \leq \ldots \leq \lambda_{N-1}.$$

Furthermore, the first eigenvector (first column of $Y^T$) is equal to 1 (vector of only ones), which is a trivial solution that maps each vertex to a point. Additionally, any two eigenvectors are orthogonal to each other. The solution to the eigenvalue problem gives N eigenvalues and corresponding eigenvectors with dimensionality N. In practice, however, only the first d eigenvectors corresponding to the lowest eigenvalues (except the trivial solution) are used.

Thus, the ith column of Y is the embedding of node i in $\mathbb{R}^d$, while every row represents the embedding of each point in different orthogonal dimensions.

Figure 3:
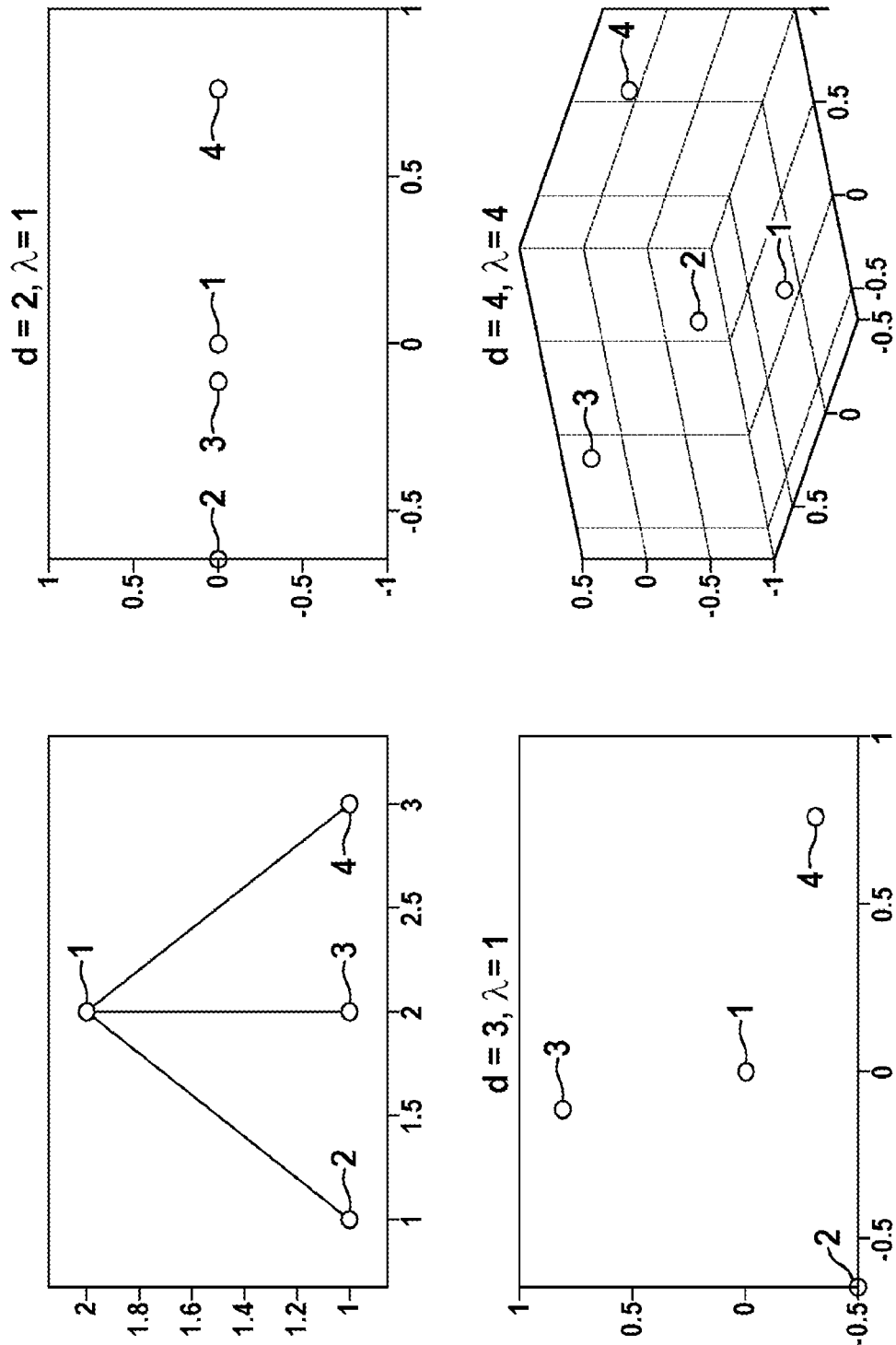
FIG. 3 shows an example embedding of a 4-node graph for descriptor determination, according to the present invention.

FIG. 3 shows an example embedding of a 4-node graph.

The eigenvalues have an important meaning regarding the optimality of the embedding. In case of an optimal embedding $Y^*$ the constraint $Y^*DY^{*T} = I$ is satisfied and consequently $$Y^*LY^{*T} = \text{diag}(\lambda), \quad (5)$$

that is, the eigenvalues correspond to the embedding errors in different dimensions. For simplicity let d=1, in which case every x is mapped to point y=1. In this case (5) simplifies to $$\hat{y}^T L \hat{y} = \lambda_0, \quad \hat{y} = [y_1, \ldots, y_N]^T = 1^T. \quad (6)$$

Since $\lambda_0 = 0$ that means that if all vertices of the object are mapped to a point the embedding error is 0 as the distance between all the points y is 0. This is not useful for practical purposes, thus the first eigenvalue and eigenvector are omitted. Using d=2 corresponds to mapping every point x onto a line and $\lambda_1$ is the corresponding embedding error, and so forth. As the eigenvectors are orthogonal to each other, increasing d will add new dimensions to the embedding that aims to minimize the error in the new, orthogonal dimension. The same effect can be seen in (3): since $Tr(YLY^T) = \Sigma_{i=1}^d \lambda_i$, the original objective can be translated to minimize the embedding error in each dimension. Thus, irrespective of the chosen d the resulting descriptor vector is optimal.

In some cases subsequent eigenvalues are identical, that is, $\lambda_i = \lambda_{i+1} = \lambda_{i+2} = \ldots$ (see the example of FIG. 3 where the eigenvalues for d=2 and d=3 are the same). This carries some information regarding symmetry where there are multiple orthogonal dimensions with identical embedding error. In fact, in the 4-node graph example of FIG. 3, if the graph is fully connected the embedding is symmetric in each dimension and all eigenvalues are identical, except for the trivial solution.

The above graph embedding approach can be directly applied to meshes, pointclouds, etc. For example, one can use the K-nearest neighbour (KNN) algorithm to form local connections between vertices and to build the adjacency matrix. This approach is sufficient to build the graph Laplacian and to compute the embedding of each vertex. Nevertheless, this approach is inherently built on Euclidean distance metric and heuristics, which does not necessarily respect the underlying Riemannian geometry of the 3D object model. For example, some edges may go through the object, or may connect non-neighbouring vertices of the mesh. Even just a few incorrect entry in the adjacency matrix may result in bad embedding performance. Therefore, according to one embodiment when working with models it is ensured that geodesic distances between any two vertices are correct, or have minimal approximation error.

In general, object models, such as meshes, or pointclouds can be represented as Riemannian manifolds embedded in $\mathbb{R}^3$. A Riemannian manifold M with a smoothly changing metric g can be considered as "locally Euclidean", which captures the local smoothness property of real-world objects. The generalization of the Laplace operator to Riemannian manifolds is the Laplace-Beltrami (LB) operator $\Delta$. Similarly to the Laplacian in Euclidean spaces, the LB operator applied on a function is the divergence of the gradient of the function. While the Laplacian for graphs and in Euclidean spaces are easy to compute (either from adjacency information, or finite differences), the LB operator in differential geometry builds on exterior calculus, and in general, is not readily available for a manifold.

For known discrete manifolds however, such as meshes, the LB operator can be approximated. This offers a highly efficient and simple computation framework when working with meshes, pointclouds, etc. As the Riemannian equivalent of the Laplace operator is the Laplace-Beltrami, the embedding approach described above can be directly applied to $\Delta$. The eigenvectors Y of $\Delta$ will represent the optimal, d-dimensional Euclidean embedding of the vertices of the mesh.

$\Delta$ can be computed for meshes efficiently as follows. Assuming a mesh is given with N vertices V, faces F and edges E. In this case the size of $\Delta$ is N×N. The ith row of $\Delta$ describes the adjacency information of the ith vertex to its connecting vertices. Let $\varphi$ be any function on the mesh. Then, applying the discrete LB operator on this function maps to $\Delta \varphi$. The ith element of this function can be described by $$(\Delta\phi)_i = \frac{1}{2}\sum_{ij\in E}\left(\cot\left(\theta_k^{ij}\right) + \cot\left(\theta_l^{ji}\right)\right)(\phi_j - \phi_i), \tag{7}$$

Figure 4:
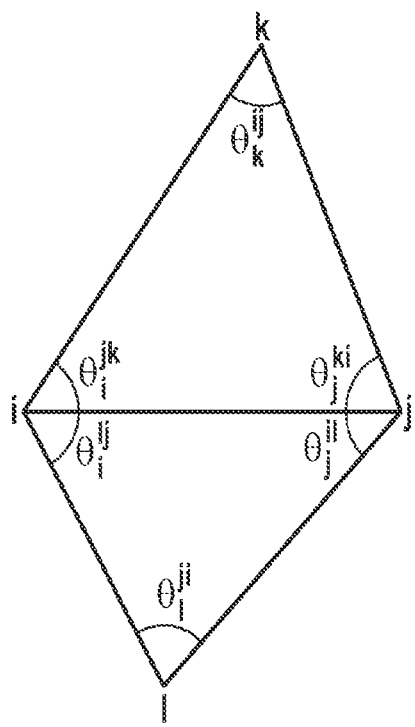
FIG. 4 illustrates the definition of angles at vertices of a 3D model for edge weight determination in accordance with the Laplace-Beltrami operator.

FIG. 4 illustrates the definition of angles $\theta_k^{ij}$ and $\theta_l^{ji}$.

The sum of the cotan terms $\cot(\theta_k^{ij})+\cot(\theta_l^{ji})$ acts as the connection weight wij. These weights occurring in (7), i.e. the weights of the LB operator when applied to the mesh, are used according to one embodiment as the weights for determining D and A of equation (2).

It should be noted that as $\alpha>\pi/2 \Rightarrow \cot(\alpha)<0$, negative connection weights wij may occur, especially if one angle is significantly larger than the others (not good faces). To overcome this issue the connection weight may be approximated by edge flipping.

The descriptor generating approach described above treats every vertex uniquely. That is, every vertex is assigned to a unique descriptor. However, objects may be symmetric, and thus, assigning unique descriptors to seemingly identical vertices will result in non-symmetric embeddings.

To address this issue, according to various embodiments, intrinsic symmetries of shapes are detected and symmetric embeddings are compressed, such that symmetric vertices map to the same descriptor. It can be shown that a shape has intrinsic symmetry if the eigenfunctions of the Laplace-Beltrami operator appear symmetric in Euclidean space. In other words, symmetric features of a mesh, pointcloud, etc., are detected when their geodesic preserving Euclidean embedding (descriptor space) shows Euclidean symmetry. A compact manifold has intrinsic symmetry if there exists a homeomorphism T which preserves geodesic distances between each vertex of the manifold.

For compressing the symmetric descriptors, so-called Global Intrinsic Symmetry Invariant Functions (GISIFs) may be used. Given a global intrinsic symmetric homeomorphism $T: \mathcal{M} \to \mathcal{M}$, s.t. $g(p, q)=g(T(p),T(q)) \forall p, q \in \mathcal{M}$, where g represents geodesic distance, and a function on the manifold f, then, if for each point p on the manifold $$f \circ T(p) = f(T(p)) = f(p), \tag{8}$$

then f is a GISIF. For example, on a torus let this homeomorphism be an arbitrary rotation around z-axis. This means that if f is a GISIF, then it has to be invariant to this rotation.

Furthermore, it can be shown show that in case of identical eigenvalues $\lambda_i=\lambda_{i+1}=\ldots=\lambda_{i+N}$, such a GISIF is the squared sum of the eigenvector components of the point, i.e.

$$f(p)=\sum_i^{i+N}\phi_i(p)^2.$$

This resonates with the above analysis of identical eigenvalues, which is the necessary condition of symmetric embeddings. Since in practice there are rarely identical eigenvalues due to numerical limitations a heuristic may be used where eigenvalues are considered to be identical if they lie within the same $\epsilon$-ball (with a small $\epsilon$), i.e. when the differ by less than a predetermined threshold, e.g. 0.1% or 0.01%. Since symmetric dimensions need only to be found once for a given object, this can be performed manually.

For example let the first 7 eigenvalues of an eigendecomposition for a torus be $\lambda_{0-6}$=[0.0, 0.0175, 0.0175, 0.069, 0.069, 0.1525, 0.1525]

A GISIF embedding in $\mathbb{R}^3$—not considering the trivial solution—is then given by $$f(p)=[\phi_1(p)^2+\phi_2(p)^2, \phi_3(p)^2+\phi_4(p)^2, \phi_5(p)^2+\phi_6(p)^2].$$

In case of multiple objects, these can be represented as multiple disconnected connected graphs. The adjacency matrix is in this case blockdiagonal. The symmetric positive definite Laplacian will again have orthogonal eigenvectors. There are two differences in the result of the eigendecomposition compared to the single graph embedding case: first, the non-decreasing eigenvalues will be the embedding errors of all the objects without order. Second, as the corresponding eigenvectors will remain orthogonal, the eigenvectors will have zero entries. This means that every dimension of the descriptor space will correspond to only one object embedding. Furthermore, the dimensions are ordered with respect to the embedding error of the corresponding object. Thus, in case a 3-dimensional embedding of two objects should be generated, d=8 is used as there are two trivial solutions corresponding to $\lambda=0$.

This straightforward approach handles multiple objects independently, while there may be sub-optimal methods that still provides reasonably good embeddings with lower d that exploits correlation between objects.

Given the poses of objects the target images can be generated by projecting the descriptors to image plane. As non-object (background) descriptor space image random noise or a single descriptor which maps to the farthest away point in descriptor space may be used.

To improve robustness of the trained network 200, image augmentation methods such as domain randomization or disturbances like Gaussian blur, cropping or dropout can be applied.

Figure 5:
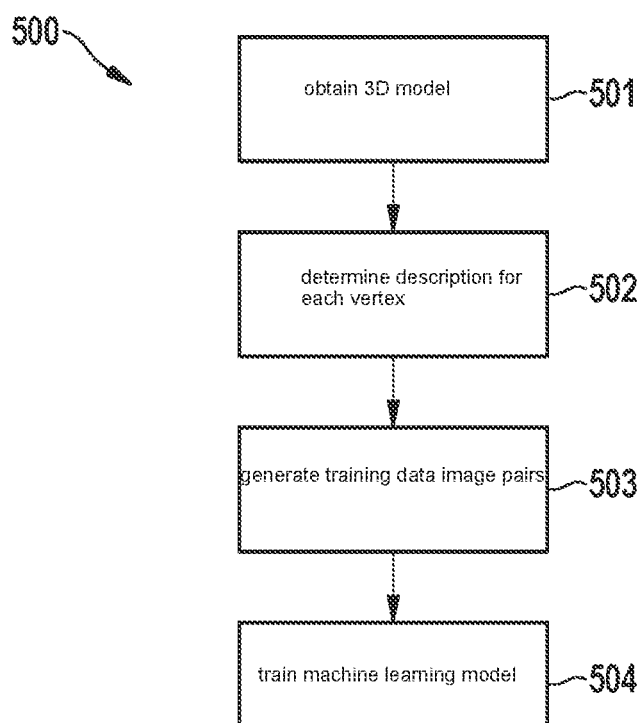
FIG. 5 shows a method for training a machine learning model for recognizing an object topology of an object from an image of the object according to an example embodiment of the present invention.

In summary, according to various embodiments, a method is provided as illustrated in FIG. 5.

FIG. 5 shows a method for training a machine learning model for recognizing an object topology of an object from an image of the object according to an embodiment.

In 501, a 3D model of the object is obtained, wherein the 3D model comprises a mesh of vertices connected by edges, wherein each edge has a weight which specifies the proximity of two vertices connected by the edge in the object. The weights may for example be obtained (i.e. determined) from a CAD model (e.g.

provided by a user).

In 502, a descriptor is determined for each vertex of the mesh by searching descriptors for the vertices which minimize the sum, over pairs of connected vertices, of distances between the descriptors of the pair of vertices weighted by the weight of the edge between the pair of vertices.

In 503, training data image pairs are generated, wherein each training data image pair comprises a training input image showing the object and a target image and wherein generating the target image comprises determining the vertex positions of vertices of the object's object model that the vertices have in the training input image and assigning, for each determined vertex position in the training input image, the descriptor determined for the vertex at the vertex position to the position in the target image.

In 504 the machine learning model is trained by supervised learning using the training data image pairs as training data.

According to various embodiments, in other words, an object is embedded in a descriptor space by locally preserving geometric properties. This is done by searching embeddings that minimize the sum, over pairs of connected vertices, of distances between the embeddings of the pair of vertices weighted by the weight of the edge between the pair of vertices, as it is described by equation (1). While in the above examples, the machine learning network is described as a neural network other kinds of regressor may be used that maps a 3D tensor to another 3D tensor.

According to various embodiments, the machine learning model assigns descriptors to pixels of the object (in image plane). This may be seens as indirectly encoding the surface topology of the object. This connection between descriptors and the surface topology may be made explicit by rendering to map the descriptors to the image plane. It should be noted that descriptor values at faces (i.e. points that are not vertices) of the object model may be determined by interpolation. For example, when a face is given by 3 vertices of the object model with their descriptor values $y_1$, $y_2$, $y_3$, respectively, then at any point of the face the descriptor value y can be calculated as a weighted sum of these values $w_1 \cdot y_1 + w_2 \cdot y_2 + w_3 \cdot y_3$. In other words, the descriptor values at the of the vertices are interpolated.

For generating image pairs for training data, an image of the object (e.g. an RGB image) including the object (or multiple objects) with known 3D (e.g. CAD) model and pose (in a global i.e. world) coordinate system to a (dense) descriptor image which is optimal in the sense that it is generated by a search for descriptors to minimize the deviation of geometric properties (specifically proximity of points of the object) between the object model and its representation (embedding) in descriptor space. In practical use, the theoretical optimal solution to the minimization will in general not be found since the search is limited to a certain search space. Nevertheless, an estimate of the minimum is determined within the limits of practical application (available accuracy of computation, maximum number of iterations etc.).

Thus, descriptors for the vertices are searched by performing a minimization process of the sum, over pairs of connected vertices, of distances between the descriptors of the pair of vertices weighted by the weight of the edge between the pair of vertices, wherein each descriptor is searched for a respective vertex of the vertices;

Each training data image pair comprises a training input image of the object and a target image, wherein the target image is generated by projecting the descriptors of the vertices visible in the training input image to the training input image plane in accordance with the pose the object has in the training input image.

The images together with their associated target images are used to train the machine learning model in a supervised fashion.

The machine learning model is thus trained to recognize unique features of an object (or multiple objects). This information can be used for different applications in robot control via evaluating the machine learning model in real-time, e.g., predicting object grasping pose for assembly. It should be noted that the supervised training approach allows for explicitly encoding symmetry information.

The method of FIG. 5 may be performed by one or more computers including one or more data processing units. The term "data processing unit" can be understood as any type of entity that allows the processing of data or signals. For example, the data or signals may be treated according to at least one (i.e., one or more than one) specific function performed by the data processing unit. A data processing unit may include an analogue circuit, a digital circuit, a composite signal circuit, a logic circuit, a microprocessor, a micro controller, a central processing unit (CPU), a graphics processing unit (GPU), a digital signal processor (DSP), a programmable gate array (FPGA) integrated circuit or any combination thereof or be formed from it. Any other way of implementing the respective functions, which will be described in more detail below, may also be understood as data processing unit or logic circuitry. It will be understood that one or more of the method steps described in detail herein may be executed (e.g., implemented) by a data processing unit through one or more specific functions performed by the data processing unit.

The term "robot" can be understood to refer to any physical system (with a mechanical part whose movement is controlled), such as a computer-controlled machine, a vehicle, a household appliance, a power tool, a manufacturing machine, a personal assistant or an access control system.

Various embodiments may receive and use sensor signals from various sensors such as a (e.g. RGB) camera, video, radar, LiDAR, ultrasonic, thermal imaging etc., for example to obtain sensor data showing an object. Embodiments may be used for generating training data and training a machine learning system, e.g. for controlling a robot, e.g. a robotic manipulator, autonomously to achieve various manipulation tasks under different scenarios. In particular, embodiments are applicable to the control and monitoring of execution of manipulation tasks, e.g., in assembly lines.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method for training a machine learning model for recognizing an object topology of an object from an image of the object, the method comprising the following steps:
    obtaining a 3D model of the object, the 3D model including a mesh of vertices connected by edges, wherein each edge of the edges has a weight which specifies a proximity of two vertices connected by the edge in the object;
    determining a descriptor for each vertex of the mesh by searching descriptors for the vertices which minimize a sum, over pairs of connected vertices, of distances between the descriptors of the pair of vertices weighted by the weight of the edge between the pair of vertices, wherein the searching of the descriptors includes determining eigenvectors of a Laplacian matrix of a graph formed by the vertices and edges of the 3D model and taking components of the eigenvectors as components of the descriptors;
    generating training data image pairs, wherein each training data image pair includes a training input image showing the object and a target image and wherein generating the target image includes:
        determining vertex positions of the vertices of the object's object model that the vertices have in the training input image, and
        assigning, for each determined vertex position in the training input image, the descriptor determined for the vertex at the vertex position to the position in the target image; and
    training the machine learning model by supervised learning using the training data image pairs as training data.

2. The method of claim 1, wherein the generating of the training data image pairs includes obtaining multiple images of the object in different poses and generating a training data image pair from each obtained image by generating a target image for the obtained image.

3. The method of claim 2, further comprising:
determining vertex positions of vertices of the object's object model that the vertices have in the training input images from the respective poses the object has in the training input images.

4. The method of 1, further comprising:
associating each vertex associated with a component position in the eigenvectors and taking, for each vertex, the components in the eigenvectors at the component position associated with the vertex as components of the descriptor for the vertex.

5. The method of claim 4, wherein the determining of the descriptors further includes compressing the descriptors by combining components of eigenvectors whose eigenvalues differ by less than a predetermined threshold to a single component.

6. The method of claim 1, wherein the obtaining of the 3D model of the object includes obtaining a 3D mesh of vertices and edges modelling the object and assigning, as the weights for the edges, edge weights of a Laplace-Beltrami operator applied to the mesh.

7. A method for controlling a robot, comprising:
training a machine learning model for recognizing an object topology of an object from an image of the object, the training including:
obtaining a 3D model of the object, the 3D model including a mesh of vertices connected by edges, wherein each edge of the edges has a weight which specifies a proximity of two vertices connected by the edge in the object;
determining a descriptor for each vertex of the mesh by searching descriptors for the vertices which minimize a sum, over pairs of connected vertices, of distances between the descriptors of the pair of vertices weighted by the weight of the edge between the pair of vertices, wherein the searching of the descriptors includes determining eigenvectors of a Laplacian matrix of a graph formed by the vertices and edges of the 3D model and taking components of the eigenvectors as components of the descriptors;
generating training data image pairs, wherein each training data image pair includes a training input image showing the object and a target image and wherein generating the target image includes:
determining vertex positions of the vertices of the object's object model that the vertices have in the training input image, and
assigning, for each determined vertex position in the training input image, the descriptor determined for the vertex at the vertex position to the position in the target image; and
training the machine learning model by supervised learning using the training data image pairs as training data;
obtaining an image showing the object;
feeding the image to the machine learning model;
determining a pose of the object from output of the machine learning model; and
controlling the robot depending on the determined pose of the object.

8. The method of claim 7, wherein the determining the object pose includes determining a position of a certain part of the object, and wherein the controlling of the robot depending on the determined pose of the object includes controlling an end-effector of the robot to move to the position of the part of the object and to interact with the part of the object.

9. A robot, comprising:
a camera configured to provide image data of an object;
a controller configured to implement a machine learning model; and
a training device configured to train the machine learning model, the training device configured to:
obtain a 3D model of the object, the 3D model including a mesh of vertices connected by edges, wherein each edge of the edges has a weight which specifies a proximity of two vertices connected by the edge in the object;
determine a descriptor for each vertex of the mesh by searching descriptors for the vertices which minimize a sum, over pairs of connected vertices, of distances between the descriptors of the pair of vertices weighted by the weight of the edge between the pair of vertices, wherein the searching of the descriptors includes determining eigenvectors of a Laplacian matrix of a graph formed by the vertices and edges of the 3D model and taking components of the eigenvectors as components of the descriptors;
generate training data image pairs, wherein each training data image pair includes a training input image showing the object and a target image and wherein generating the target image includes:
determining vertex positions of the vertices of the object's object model that the vertices have in the training input image, and
assigning, for each determined vertex position in the training input image, the descriptor determined for the vertex at the vertex position to the position in the target image; and
train the machine learning model by supervised learning using the training data image pairs as training data.

10. The robot according to claim 9, further comprising:
at least one actuator, wherein the controller is configured to control the at least one actuator using an output from the machine learning model.

11. A non-transitory computer readable medium on which are store instructions for training a machine learning model for recognizing an object topology of an object from an image of the object, the instructions, when executed by a processor, causing the processor to perform the following steps:
obtaining a 3D model of the object, the 3D model including a mesh of vertices connected by edges, wherein each edge of the edges has a weight which specifies a proximity of two vertices connected by the edge in the object;
determining a descriptor for each vertex of the mesh by searching descriptors for the vertices which minimize a sum, over pairs of connected vertices, of distances between the descriptors of the pair of vertices weighted by the weight of the edge between the pair of vertices, wherein the searching of the descriptors includes determining eigenvectors of a Laplacian matrix of a graph formed by the vertices and edges of the 3D model and taking components of the eigenvectors as components of the descriptors;
generating training data image pairs, wherein each training data image pair includes a training input image showing the object and a target image and wherein generating the target image includes:
determining vertex positions of the vertices of the object's object model that the vertices have in the training input image, and
assigning, for each determined vertex position in the training input image, the descriptor determined for the vertex at the vertex position to the position in the target image; and
training the machine learning model by supervised learning using the training data image pairs as training data.

\* \* \* \* \*